(12) United States Patent
Shimizu et al.

(10) Patent No.: US 9,026,352 B2
(45) Date of Patent: May 5, 2015

(54) DRIVING ASSISTANCE DEVICE AND DRIVING ASSISTANCE METHOD

(75) Inventors: Masayuki Shimizu, Susono (JP); Shoichi Hayasaka, Atsugi (JP); Minami Sato, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/344,712

(22) PCT Filed: Sep. 14, 2011

(86) PCT No.: PCT/JP2011/071039
§ 371 (c)(1),
(2), (4) Date: Mar. 13, 2014

(87) PCT Pub. No.: WO2013/038531
PCT Pub. Date: Mar. 21, 2013

(65) Prior Publication Data
US 2014/0358392 A1  Dec. 4, 2014

(51) Int. Cl.
| | |
|---|---|
| G08G 1/16 | (2006.01) |
| B60R 21/00 | (2006.01) |
| B60W 30/095 | (2012.01) |
| B60W 30/09 | (2012.01) |
| B60W 50/00 | (2006.01) |

(52) U.S. Cl.
CPC ............ *G08G 1/166* (2013.01); *B60W 50/0097* (2013.01); *B60W 30/0953* (2013.01); *B60W 30/095* (2013.01); *B60W 30/09* (2013.01); *B60W 2050/0026* (2013.01); *B60W 2520/10* (2013.01); *B60W 2550/10* (2013.01); *B60W 2550/302* (2013.01); *B60W 2550/306* (2013.01); *B60W 2550/308* (2013.01)

(58) Field of Classification Search
CPC .... G08G 1/166; B60W 30/09; B60W 30/095; B60W 30/0953; B60W 2050/0026; B60W 2520/10; B60W 2550/302; B60W 2550/306; B60W 2550/308; B60W 2550/10; B60W 50/0097; B60W 2710/18
See application file for complete search history.

(56) References Cited

U.S. PATENT DOCUMENTS

| | | | |
|---|---|---|---|
| 6,624,782 B2 * | 9/2003 | Jocoy et al. | 342/70 |
| 8,577,550 B2 * | 11/2013 | Lu et al. | 701/41 |
| 2010/0042323 A1 * | 2/2010 | Harada et al. | 701/300 |

FOREIGN PATENT DOCUMENTS

| | | | |
|---|---|---|---|
| JP | 2004-302621 A | | 10/2004 |
| JP | 2010-123026 | * | 6/2010 |
| JP | 2010-257298 A | | 11/2010 |

\* cited by examiner

*Primary Examiner* — Michael J Zanelli
(74) *Attorney, Agent, or Firm* — Kenyon & Kenyon LLP

(57) ABSTRACT

A driving support apparatus includes a collision time prediction unit that predicts a TTC and a TTV, a driving support determination unit that applies the TTC and TTV to a map and determines whether the driving support in the host vehicle is to be implemented or not, a driving support control unit that controls the driving support in the host vehicle, an extension mode determination unit that determines whether a speed of the moving object in a direction crossing the traveling direction is equal to or less than a first threshold value and whether the TTC is equal to or less than a second threshold value or not, and determines that the driving support is to be implemented in the host vehicle in a case where the above conditions are satisfied.

17 Claims, 11 Drawing Sheets

DRIVING ASSISTANCE DEVICE AND DRIVING ASSISTANCE METHOD

CROSS-REFERENCE TO RELATED APPLICATION

This is a national phase application based on the PCT International Patent Application No. PCT/JP2011/071039 filed on Sep. 14, 2011, the entire contents of which are incorporated herein by reference.

TECHNICAL FIELD

The present invention relates to a driving support apparatus and a driving support method that implement a driving support for avoiding a collision of a host vehicle and a moving object.

BACKGROUND ART

As a driving support apparatus in the related art, for example, an apparatus disclosed in Patent Literature 1 is known. In the driving support apparatus disclosed in Patent Literature 1, a position of an object which is present in a traveling direction of the host vehicle is detected, and then, it is determined whether or not a lateral movement speed of the detected object with respect to the traveling direction is equal to or less than a predetermined speed. Then, in the driving support apparatus, in a case where the lateral movement speed is determined to be less than the predetermined speed, based on a detected angle formed by the detection direction of the moving object and the traveling direction of the host vehicle, a possibility of a collision between the host vehicle and the moving object is determined.

CITATION LIST

Patent Literature

[Patent Literature 1] Japanese Unexamined Patent Application Publication No. 2010-257298

SUMMARY OF INVENTION

Technical Problem

Incidentally, in a situation where a pedestrian who is in front in the traveling direction of a vehicle attempts to cross the road, there is a case in which the pedestrian has finished crossing the road already when the host vehicle arrives at the position where the pedestrian is positioned, even though the driving support for avoiding the collision with the pedestrian is not implemented. In the driving support apparatus in the related art, there is a concern that even in such a situation, also in a case where the lateral movement speed is less than the predetermined speed, based on the detected angle formed with the host vehicle, a possibility of collision is determined, and the driving support is implemented. Accordingly, there is a possibility that an unnecessary driving support is implemented, and a problem that the driver may feel uncomfortable due to the difference between the actual situation and the implemented driving support may occur.

The present invention is made to solve the problem described above, and has an object to provide a driving support apparatus and a driving support method that enable implementation of an effective driving support by appropriately determining necessity of the driving support.

Solution to Problem

In order to solve the problem described above, a driving support apparatus according to the present invention implements a driving support for avoiding a collision of a host vehicle and a moving object, and includes: first time prediction means for predicting a first time that it takes for the host vehicle to arrive at an intersection where the host vehicle and the moving object cross, in a traveling direction of the host vehicle and a direction crossing the traveling direction; second time prediction means for predicting a second time that it takes for the moving object to arrive at the intersection, in a direction crossing the traveling direction; first driving support determination means for determining whether the driving support is to be implemented or not in the host vehicle by applying the first time and the second time predicted by the first time prediction means and the second time prediction means, respectively, to a first map set in advance; driving support control means for controlling the driving support in the host vehicle in a case where the first driving support determination means determines that the driving support is to be implemented in the host vehicle; and second driving support determination means for determining whether a speed of the moving object in a direction crossing the traveling direction is equal to or less than a first threshold value and whether the first time is equal to or less than a second threshold value or not in a case where the first driving support determination means determines that the driving support is not to be implemented, and for determining that the driving support is to be implemented in the host vehicle in a case where the conditions are satisfied. In the driving support apparatus, in a case where the second driving support determination means determines that the driving support is to be implemented, even in a case where the first driving support determination means determines that the driving support is not to be implemented, the driving support control means continues to implement the driving support in the host vehicle.

In the driving support apparatus, the first time that it takes for the host vehicle to arrive at the intersection in the traveling direction of the host vehicle, and a second time that it takes for the moving object to arrive at the intersection in a direction crossing the traveling direction, that is, the horizontal direction of the vehicle, are predicted, and then the predicted first time and the second time are applied to the first map to determine the necessity of the driving support. In this way, by predicting the second time that it takes for the moving object to arrive at the intersection, it is possible to appropriately determine the necessity of the driving support. As a result, an effective driving support can be implemented.

Here, in the driving support apparatus, in a case where the moving object stops moving, that is, when the speed of the moving object is "0", the driving support is determined to be not necessary. In this case, since the driving support is not implemented even though the moving object is present in front of the host vehicle, there is a possibility of making the driver uncomfortable. Therefore, according to the invention, in a case where the first driving support determination means determines that the driving support is not to be implemented, the determination whether a speed of the moving object in a direction crossing the traveling direction is equal to or less than a first threshold value and whether the first time is equal to or less than a second threshold value or not is performed, and in a case where the above conditions are satisfied, even in a case where the first driving support determination means determines that the driving support is not to be implemented, the driving support in the host vehicle continues to be implemented. Therefore, since the driving support is continued to be implemented even when the moving object stops moving, it is possible to reduce the discomfort of the driver.

The driving support apparatus further includes traveling state detection means for detecting a traveling state of the host vehicle and moving object state detection means for detecting a state of the moving object. The first time prediction means and the second time prediction means predict the first time and the second time, respectively, based on the traveling state of the host vehicle detected by the traveling state detection means and the state of the moving object detected by the moving object state detection means. According to such a configuration, the first time and the second time can be predicted more accurately.

The second driving support determination means determines whether the first time is equal to or less than the second threshold value or not using a second map set in advance. In this way, by using the second map set in advance, it is possible to satisfactorily determine whether the first time is equal to or less than the second threshold value or not.

In the second map, a determination area specified by the first time and a distance in a width direction of the host vehicle is set. In a case where the first time is in the determination area, the second driving support determination means determines that the first time is equal to or less than the second threshold value, and in a case where the moving object is in the determination area, determines that the driving support be implemented. In this way, by using the second map on which the determination area is set, it is possible to accurately determine whether the driving support is to be implemented or not.

The driving support apparatus further includes a plurality of second maps on which the determination areas are set according to the speed of the moving object. The second driving support determination means changes the second map used according to the speed of the moving object in a direction crossing the traveling direction. In this way, it is possible to more appropriately determine whether the driving support is to be implemented or not.

In a case where the second driving support determination means determines that the driving support is to be implemented, the driving support control means performs the control such that a braking control release slope when the braking control is released becomes more gradual than usual. In this way, the driving support is continued to be implemented.

In a case where the second driving support determination means determines that the driving support is to be implemented, the driving support control means performs the control such that a predetermined amount of braking is maintained for a certain time interval. In this way, the driving support is continued to be implemented.

In the first map, the first time is set as the vertical axis and the second time is set as the horizontal axis, and a first area where the driving support is determined to be not necessary and a second area where the driving support is determined to be necessary are set. In a case where a point where the first time and the second time intersect is present in the second area, the first driving support determination means determines that the driving support is to be implemented in the host vehicle. By using the first map, it is possible to more accurately determine the necessity of the driving support.

A driving support method is a method for avoiding a collision of a host vehicle and a moving object, and includes: a first time prediction step of predicting a first time that it takes for the host vehicle to arrive at the intersection where the host vehicle and the moving object cross, in a traveling direction of the host vehicle and a direction crossing the traveling direction; a second time prediction step of predicting a second time that it takes for the moving object to arrive at the intersection, in a direction crossing the traveling direction; a first driving support determination step of determining whether the driving support is to be implemented or not in the host vehicle by applying the first time and the second time predicted in the first time prediction step and the second time prediction step, respectively, to a first map set in advance; a driving support control step of controlling the driving support in the host vehicle in a case where the driving support is determined to be implemented in the host vehicle in the first driving support determination step; and a second driving support determination step of determining whether a speed of the moving object in a direction crossing the traveling direction is equal to or less than a first threshold value and whether the first time is equal to or less than a second threshold value or not in a case where the driving support is determined to be not implemented in the first driving support determination step; and for determining that the driving support is to be implemented in the host vehicle in a case where the conditions are satisfied. In a case where the driving support is determined is to be implemented in the second driving support determination step, even in a case where the driving support is determined to be not implemented in the first driving support determination step, the driving support in the host vehicle is continued to be implemented in the driving support control step.

Advantageous Effects of Invention

According to the present invention, an effective driving support can be implemented by appropriately determining necessity of the driving support.

DESCRIPTION OF EMBODIMENTS

Hereinafter, preferred embodiments of the present invention will be described in detail with reference to the drawings attached hereto. Here, the same or equivalent elements are referenced by the same numerals in describing the drawings, and the description will not be duplicated.

Figure 1:
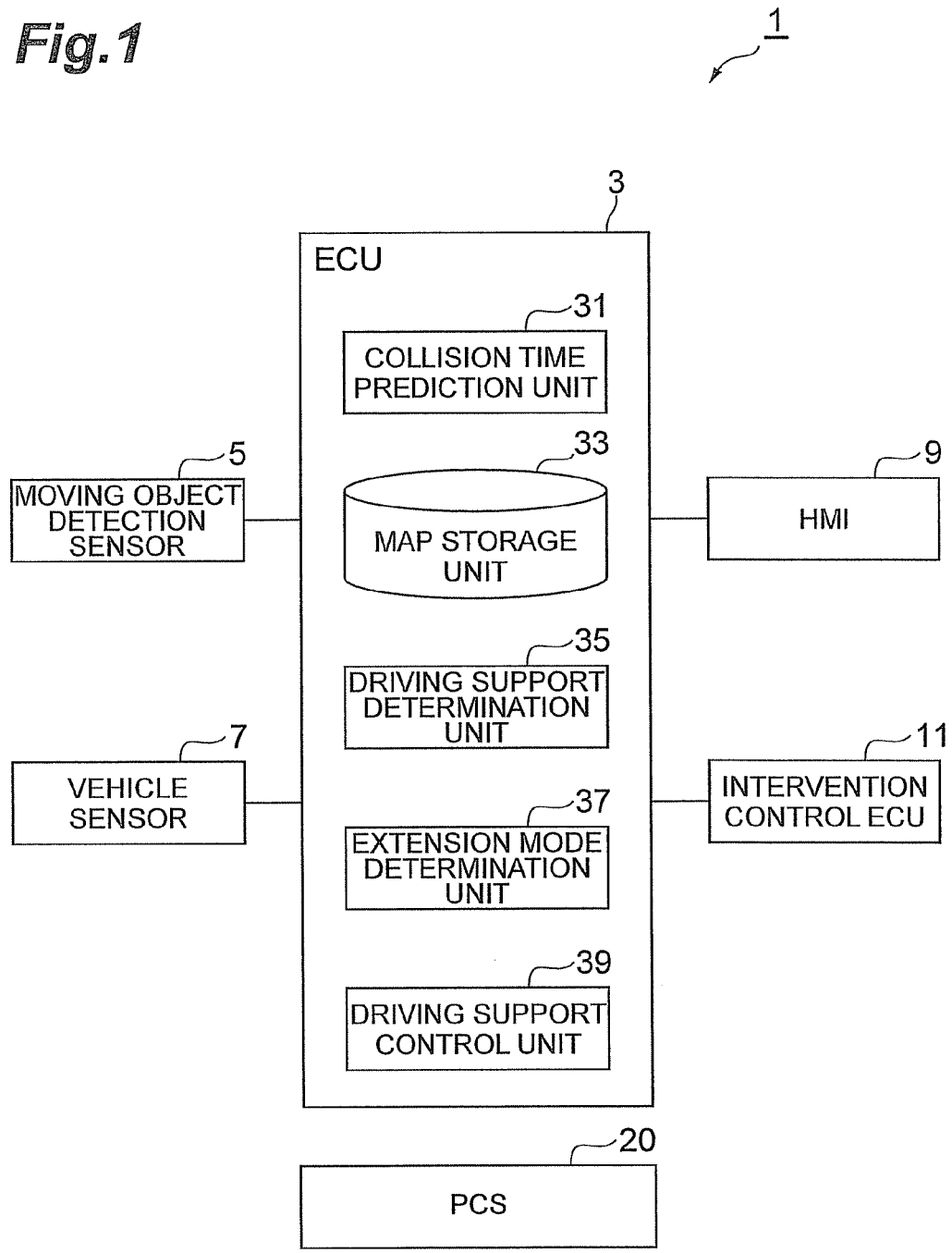
FIG. 1 is a diagram illustrating a driving support system that includes a driving support apparatus according to an embodiment.

FIG. 1 is a diagram illustrating a configuration of a driving support system that includes a driving support apparatus according to an embodiment. The driving support system 100 illustrated in FIG. 1 is a system that is mounted on a vehicle such as a car, and performs a driving support for avoiding a collision with a moving object such as a pedestrian, a bicycle, or the like. Moreover, the driving support includes directly performing an intervention control such as braking or steering in a host vehicle, and giving a warning to a driver.

As illustrated in FIG. 1, the driving support system 100 is configured to include a driving support apparatus 1, and a pre-crash system (PCS) 20. The driving support apparatus 1 includes an electronic control unit (ECU) 3. A moving object detection sensor (moving object state detection means) 5, a vehicle sensor (traveling state detection means) 7, a human machine interface (HMI) 9, and an intervention control ECU 11 are connected to the ECU 3. The ECU 3 and the intervention control ECU 11 is the electronic control unit made from a central processing unit (CPU), a read only memory (ROM), a random access memory (RAM), and the like, and is operated by the program.

The PCS 20 operates in parallel with the ECU 3 of the driving support apparatus 1. The PCS 20 is connected to the moving object detection sensor 5, the vehicle sensor 7, the HMT 9 and the intervention control ECU 11, as similar to the ECU 3 but not illustrated. The PCS 20 calculates a time to collision (TTC) with respect to the moving object based on information detected by the moving object detection sensor 5 and the vehicle sensor 7 described below. Here, the TTC is a value indicating how many seconds will elapse before the collision occurs, in a case where the host vehicle and the moving object continues to travel under a current traveling state. The PCS 20 causes the intervention control ECU 11 to implement the automatic intervention control in a case where the TTC is equal to or less than a predetermined value.

The moving object detection sensor 5 is an external sensor that detects the moving object. The moving object detection sensor 5 is, for example, imaging means such as laser radar, millimeter wave radar, or a camera. In a case of being millimeter wave radar, the moving object detection sensor 5 detects the moving object positioned in front of the host vehicle, and generates moving object information such as a position and a speed of the moving object based on the detection result. The moving object detection sensor 5 outputs the moving object information to the ECU 3. Moreover, in a case of being a camera, the moving object detection sensor 5 generates the moving object information by implementing image processing on the captured image. The moving object detection sensor 5 may be configured with both of the millimeter wave radar and a camera.

The vehicle sensor 7 is an internal sensor that detects the traveling state of the host vehicle. The vehicle sensor 7 is, for example, a yaw rate sensor that detects a yaw rate of the host vehicle, a steering angle sensor that detects a steering angle in steering, or a vehicle speed sensor that detects the speed (traveling speed) of the vehicle. The vehicle sensor 7 outputs vehicle information that indicates the detected traveling state of the host vehicle to the ECU 3.

The ECU 3 includes a collision time prediction unit (first time prediction means and second time prediction means) 31, a map storage unit 33, a driving support determination unit (a first driving support determination means) 35, an extension mode determination unit (second driving support determination means) 37, and a driving support control unit (driving support control means) 39.

The collision time prediction unit 31 is a part that predicts a time that it takes for the host vehicle and the moving object to arrive at an intersection (collision point). When the moving object information output from the moving object detection sensor 5 and the vehicle information output from the vehicle sensor 7 are received, the collision time prediction unit 31 calculates, based on the moving object information and the vehicle information, the collision time of the host vehicle and the moving object, that is, the time that it takes for the host vehicle and the moving object, respectively, to arrive at the intersection where the host vehicle and the moving object cross.

The collision time prediction unit 31 obtains a forecasted trajectory of the host vehicle based on the vehicle information, and calculates the time that it takes for the host vehicle to arrive at the intersection, that is, the TTC (a first time) which is a value indicating how many seconds will elapse before the host vehicle collides with the moving object in a case where the host vehicle travels in a traveling direction in the current state. In addition, the collision time prediction unit 31 obtains a speed vector or the like of the moving object, based on the moving object information, and calculates the time that it takes for the moving object to arrive at the intersection, that is, a time to vehicle (TTV, a second time) which is a value indicating how many seconds will elapse before the moving object collides with the host vehicle in a case where the moving object moves in a direction crossing the traveling direction of the host vehicle (the lateral direction of the host vehicle) in the current state.

The collision time prediction unit 31 calculates the TTC and the TTV by Equations (1) and (2) shown below.

$$TTC = x/(V-vx) \quad (1)$$

$$TTV = y/vy \quad (2)$$

In Equations (1) and (2) above, V indicates a speed of the host vehicle, x and y indicate a relative position of the moving object, and vx and vy indicate the speed of the moving object. The collision time prediction unit 31 outputs TTC information and TTV information that respectively indicate the calculated TTC and TTV, to the driving support determination unit 35.

Figure 2:
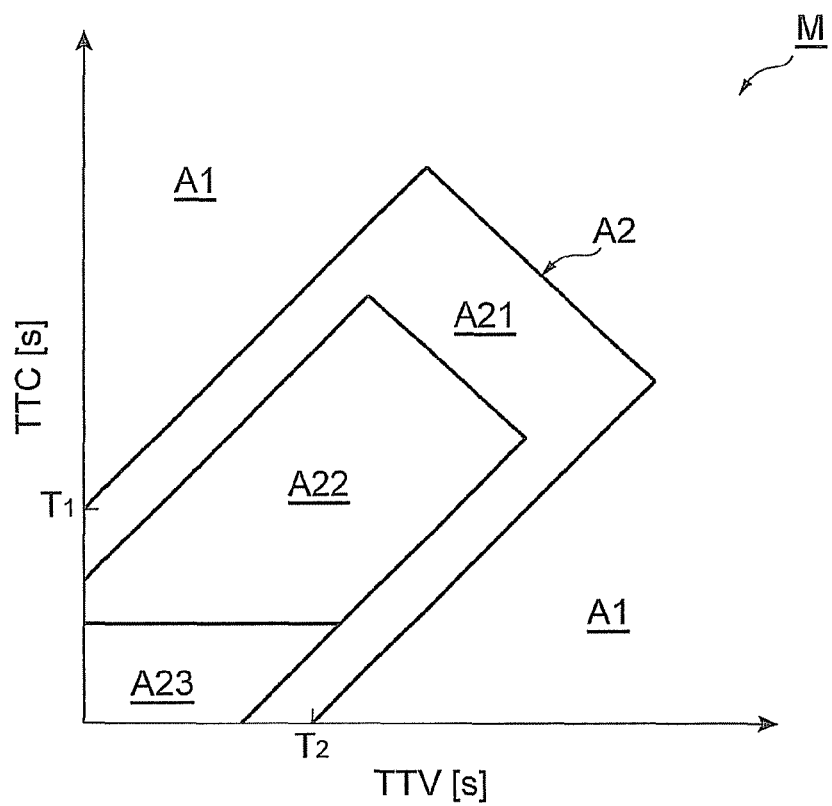
FIG. 2 is a diagram illustrating a map.

The map storage unit 33 stores a map (a first map) M. FIG. 2 is a diagram illustrating the map. As illustrated in FIG. 2, in the map M, a vertical axis is set to TTC [s], a horizontal axis is set to TTV [s], and the origin is set to the intersection of the host vehicle and the moving object. In the map M, the point which is located away from the origin (the TTC and the TTV increase) means that the host vehicle or the moving object are positioned at the position located away from the intersection. In the map M, a driving support unnecessary area (a first area) A1 and a driving support area (a second area) A2 are set. The map M will be described below in detail.

The driving support area A2 is a region surrounded by a function y=fx (TTC, TTV). Two straight lines that define the driving support area A2 are set to be a difference between the TTC and the TTV (TTC−TTV). In the map M, $T_1$ and $T_2$ are set to one to three seconds, for example.

In the driving support area A2, control contents of the driving support are set in advance and an HMI area A21, an intervention control area A22, and an emergency intervention control area A23 are set. The HMI area A21 is an area where the driving support such as performing a warning with respect to the driver is implemented. The intervention control area A22 is set inside the HMI area A21. The intervention control area A22 is an area where an intervention control such as braking is implemented. The emergency intervention control area A23 is an area where emergency braking or the like is implemented, and an emergency intervention control is implemented for avoiding the collision. The emergency intervention control area A23 is set near the origin of the map M, that is, near the intersection of the host vehicle and the moving object.

The driving support unnecessary area A1 is the area other than the driving support area A2, and is the area where the driving support for avoiding the collision of the host vehicle and the moving object is not necessary. That is, in a case of the driving support unnecessary area A1, at the time when the host vehicle arrives at the intersection, the moving object has already passed the intersection, or the moving object is positioned at a position away from the intersection.

In the map M, the driving support area A2 and the driving support unnecessary area A1 may be set based on experimental data or the like, or may be set by learning the driving characteristics (acceleration characteristics, braking characteristics, and the like) of the driver. In addition, in the map M, the amount of control of the driving support may be set in the intervention control area A22 and the emergency intervention control area A23 respectively. The map M stored in the map storage unit 33 is made to be updatable (updating of the map M).

Figure 3:
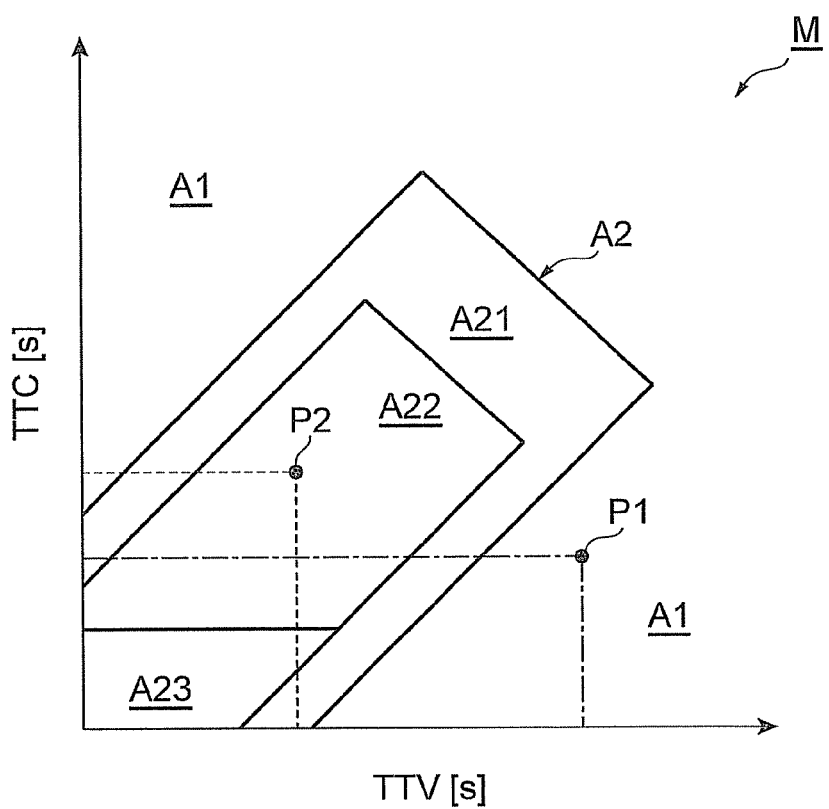
FIG. 3 is a diagram describing a method of determining necessity of the driving support in a driving support determination unit.

The driving support determination unit 35 is a part that determines whether the driving support is to be implemented or not in the host vehicle. The driving support determination unit 35 applies the TTC and the TTV to the map M, and determines whether the driving support is to be implemented or not in the host vehicle. Specifically, the driving support determination unit 35 applies the TTC information and the TTV information output from the collision time prediction unit 31 to the map M, and determines on which area on the map M, the intersection where the TTC and the TTV cross is positioned. For example, as illustrated in FIG. 3, in a case where the TTC and the TTV cross at the point P1, since the point P1 is in the driving support unnecessary area A1, the driving support determination unit 35 determines that the driving support in the host vehicle is not to be implemented. That is, for example, in a case of crossing at the point P1, at the time when the moving object arrives at the intersection, the host vehicle has already passed the intersection. The driving support determination unit 35 outputs support non-implementation information which indicates that the driving support is not to be implemented, to the extension mode determination unit 37.

In contrast, in a case where the TTC and the TTV cross at the point P2, since the point P2 is in the driving support area A2 (intervention control area A22), the driving support determination unit 35 determines that the driving support in the host vehicle is implemented. In a case of determining the driving support is to be implemented, the driving support determination unit 35 outputs support implementation information with information which indicates any of the HMT area A21, the intervention control area A22, or the emergency intervention control area A23, to the driving support control unit 39.

The extension mode determination unit 37 is a part that determines whether the extension mode is to be implanted or not, in a case where, after the determination in the driving support determination unit 35 that the driving support is to be implemented, the speed vy of the moving object is equal to or less than the predetermined value (a first threshold value). The extension mode determination unit 37 determines whether the extension mode is to be implemented or not when the support non-implementation information is received from the driving support determination unit 35. The extension mode will be described with reference to FIG. 4.

Figure 4:
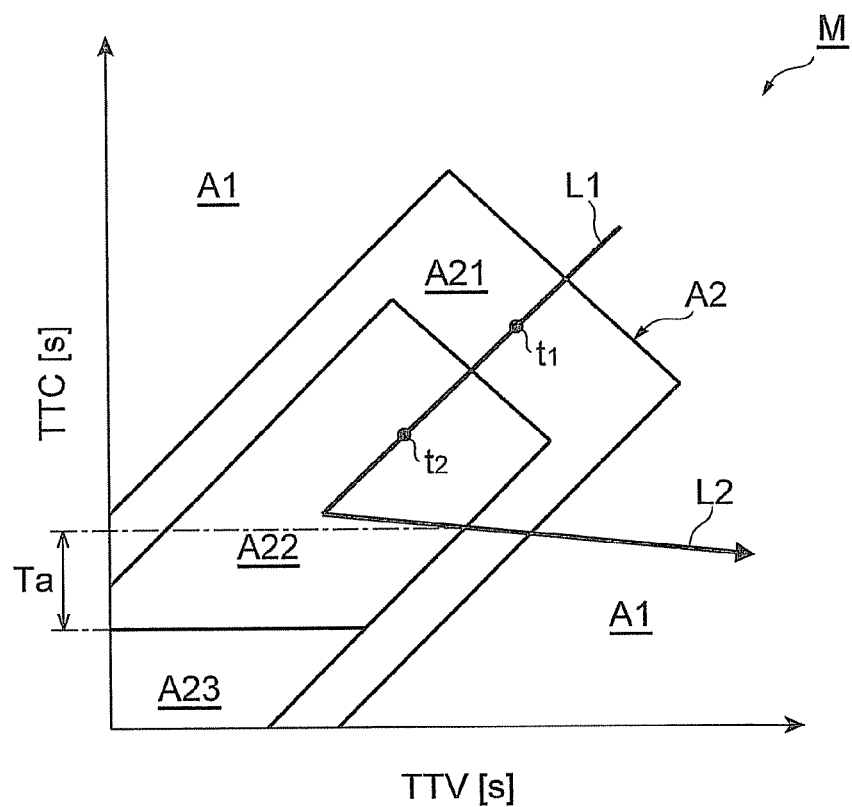
FIG. 4 is a diagram describing an extension mode.

FIG. 4 is a diagram for describing the extension mode. In FIG. 4, in a case where the host vehicle and the moving object approach the intersection in a certain state, the host vehicle and the moving object are present on $t_1$, $t_2$, respectively on the line L1 with the passage of time. Here, in a case where the moving object stops moving in a lateral direction, that is, the speed vy becomes "0", since the TTV becomes infinity (TTV→∞), the trajectory is shown as a line L2. In this case, the driving support determination unit 35 determines that the driving support is not to be implemented. At this time, in a case where the host vehicle maintains the traveling state, the PCS 20 operates so as to avoid the collision. However, the PCS 20 does not operate until the TTC is determined to be equal to or less (corresponding to the emergency intervention control area A23 in the map M) than the threshold value. Therefore, at the time when the driving support is determined to stop by the driving support determination unit 35, that is, during the time interval from the time when the speed vy of the moving object is "0" to the time when the PCS 20 operates, there is a time interval in which the driving support is not implemented (Ta [s] in FIG. 4).

Therefore, in order to link the control from the time when the driving support stops to be implemented in the driving support apparatus 1 until the driving support starts in the PCS 20, the driving support which is implemented in a case where the driving support is determined to be implemented by the driving support determination unit 35 in the driving support apparatus 1, is extended (continued). This control is the extension mode. The extension mode determination unit 37 determines whether the extension mode is to be implemented or not using a determination map (a second map) MC.

Figure 5:
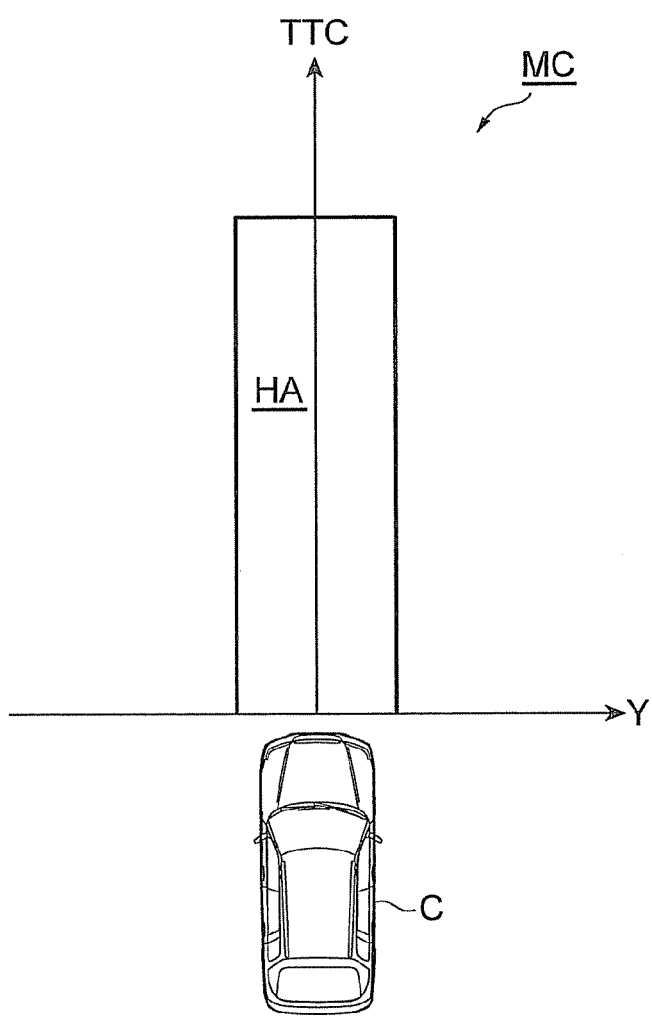
FIG. 5 is a diagram illustrating a determination map.

FIG. 5 is a diagram illustrating the determination map. The determination map MC illustrated in FIG. 5 is stored in the map storage unit 33. In the determination map MC, the vertical axis is set to the TTC [s], and the horizontal axis is set to the Y [m]. A determination area (determination region) HA is set in the determination map MC. In the determination area HA, the TTC is set to a predetermined time (a second threshold value) and the Y in the lateral direction (the width direction of the host vehicle C) is set to a predetermined distance, and the extension mode that extends the intervention control until the intervention control for avoiding the collision is implemented by the PCS 20. In the determination map MC, the determination area HA may be set based on the experimental data and the like, or may be set by learning the driving characteristics (acceleration characteristics, braking characteristics, and the like) of the driver. The determination area HA includes at least the range where the intervention control is implemented in the PCS 20.

The extension mode determination unit 37 determines to implement the extension mode in a case where the moving object is positioned on the determination area HA in the determination map MC, that is, in a case where the TTC is equal to or shorter than the predetermined time, and the moving object is present within the predetermined range in the lateral direction. The extension mode determination unit 37, in a case where the extension mode is determined to be implemented, outputs extension mode information to the driving support control unit 39.

Referring back to FIG. 1, the driving support control unit 39 is a part that controls the driving support in the host vehicle. When the support implementation information output from the driving support determination unit 35 is received, the driving support control unit 39 controls the driving support (intervention control) based on the support implementation information. The intervention control is the braking control or the steering control, for example. The driving support control unit 39 outputs a warning instruction signal to the HMI 9 in a case where information indicating the HMI area A21 is included in the support implementation information.

The driving support control unit 39 calculates the amount of control of the intervention control in a case where the information indicating the intervention control area A22 and the emergency intervention control area A23 is included in the support implementation information. The driving support control unit 39 calculates the amount of control (target acceleration (deceleration), speed) of the braking based on the map M in a case where the amount of control in the intervention control area A22 and the emergency intervention control area A23 in the map M is set. In addition, the driving support control unit 39 calculates the amount of braking based on Equation (3) described below in a case where the amount of control in the map M is not set.

$$\alpha \times TTC + \beta \times TTV + \gamma \qquad (3)$$

Here, $\alpha$ and $\beta$ are coefficients, and $\gamma$ is a constant. $\alpha$, $\beta$, and $\gamma$ are set based on the experimental value, or the like. In addition, the amount of control of steering is calculated based on the experimental value or a predetermined equation. The driving support control unit 39 outputs the intervention control signal including the amount of control to the intervention control ECU 11.

In addition, when the extension mode information output from the extension mode determination unit 37 is received, the driving support control unit 39 calculates the amount of control of the extension mode. Specifically, the driving support control unit 39 calculates the amount of control in which a braking control release slope when the braking control is finished becomes more gradual than than usual, as illustrated in FIG. 6.

Figure 6:
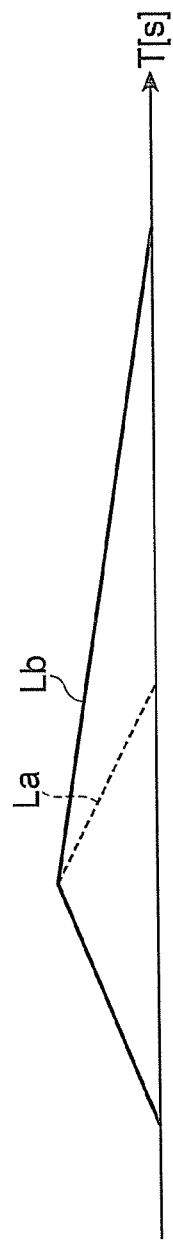
FIG. 6 is a diagram illustrating a method of calculating an amount of braking.

In FIG. 6, a portion indicated by a dot line La is a braking control release slope when the braking control is finished in normal, and a portion indicated by a solid line Lb is the braking control release slope when the braking control is finished in the extension mode. The driving support control unit 39 calculates the amount of control in the extension mode in which the braking control release slope illustrated in FIG. 6 is achieved, using the Equation (4) described below.

$$(Ax_{off} - Ax_{pcs} + \beta)/(TTc_{off} - TTC_{pcs} + \alpha) \qquad (4)$$

In the Equation (4) described above, $Ax_{off}$ is a deceleration when the control is finished, $Ax_{pcs}$ is a deceleration linked to the PCS, $TTC_{off}$ is the TTC when the control is finished, $TTC_{pcs}$ is a TTC during which the PCS control is performed, and $\alpha$ and $\beta$ are variables for adjusting the control. The driving support control unit 39 outputs the extension control signal including the amount of control in the extension mode to the intervention control ECU 11.

For example, a buzzer, a head up display (HUD), a monitor of a navigation system, and a meter panel are examples of the HMI 9. When the warning instruction signal output from the ECU 3 is received, the HMI 9 sounds a warning voice which warns the driver that the moving object is present ahead, or displays a warning statement or the like. For example, in a case where the HMI 9 is the HUD, the HMT 9 displays a pop-up on a windshield indicating that the moving object is present.

The intervention control ECU 11 is an ECU that causes the host vehicle to implement the intervention control. The intervention control ECU 11 is configured to include a brake ECU, an engine ECU, or the like (none of these are illustrated). When the intervention control signal output from the ECU 3 is received, the intervention control ECU 11 controls, for example, a brake actuator or a steering actuator (both are not illustrated) according to the amount of control included in the intervention control signal, and implements an automatic intervention.

In addition, when the extension control signal output from the ECU 3 is received, the intervention control ECU 11 controls the brake actuator according to the amount of control of the extension mode included in the extension control signal, and implements the braking control as illustrated in FIG. 6.

Figure 7:
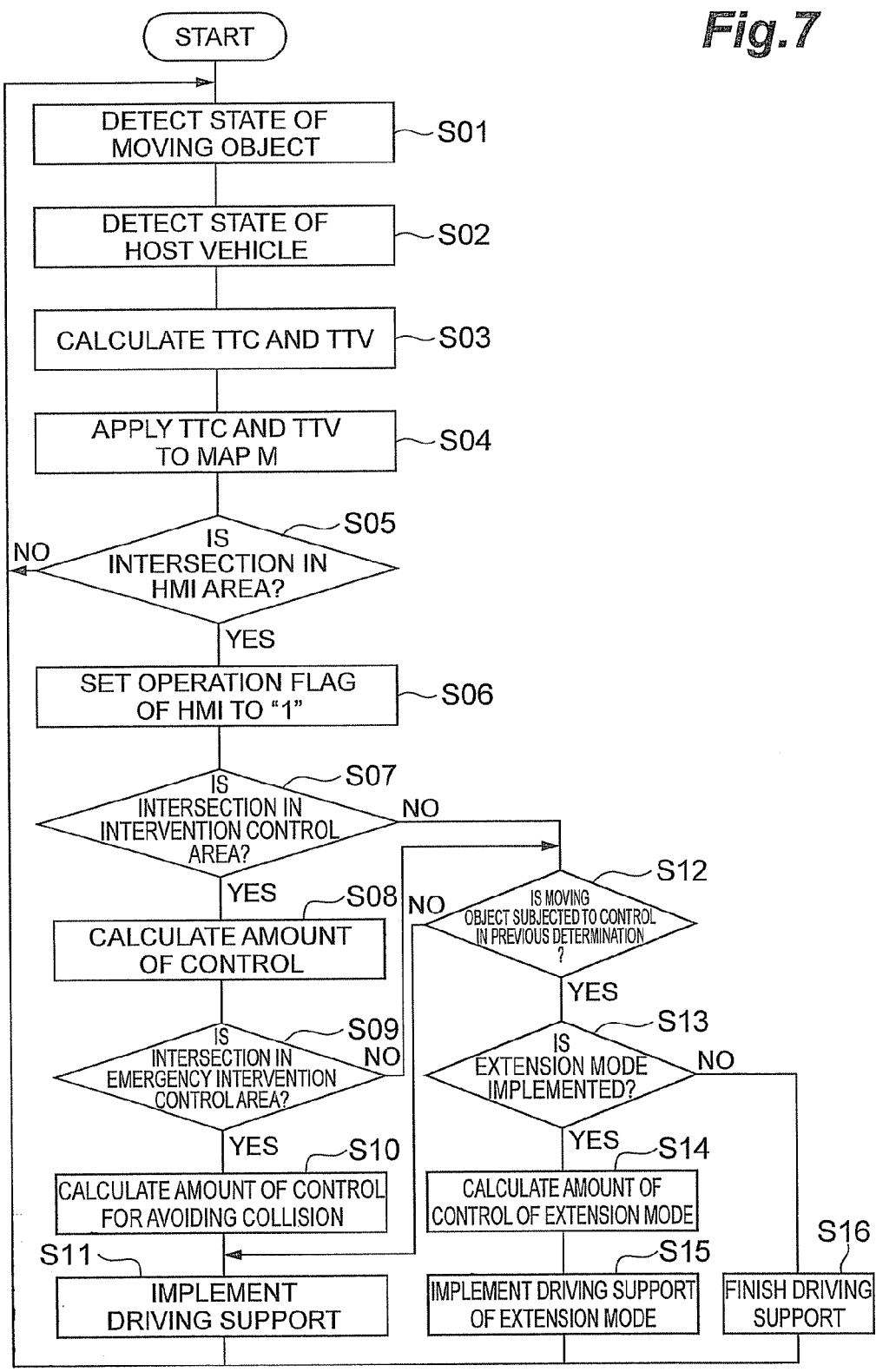
FIG. 7 is a flow chart illustrating an operation of the driving support apparatus.

Subsequently, the operation of the driving support apparatus 1 will be described. FIG. 7 is a flowchart illustrating the operation of the driving support apparatus.

As illustrated in FIG. 7, first, the state of the moving object is detected by the moving object detection sensor 5 (STEP S01). In addition, the traveling state of the host vehicle is detected by the vehicle sensor 7 (STEP S02). Next, based on the moving object information and the vehicle information detected by the moving object detection sensor 5 and the vehicle sensor 7, respectively, the TTC and TTV are calculated by the collision time prediction unit 31 (STEP S03).

Subsequently, the TTC and TTV calculated by the collision time prediction unit 31 are applied to the map M stored in the map storage unit 33 (STEP S04), and the determination whether the driving support is to be implemented or not in the host vehicle is performed by the driving support determination unit 35.

In the driving support determination unit 35, the determination whether or not the intersection of the TTC and TTV is in the HMI area A21, that is, in the driving support area A2, is performed (STEP S05). In a case where the intersection is determined to be in the HMI area A21, an operation flag of the HMI is set to "1" (STEP S06). In contrast, in a case where the intersection is not determined to be in the HMI area A21, that is, the intersection is determined to be in the driving support unnecessary area A1, the process returns to STEP S01.

Next, in the driving support control unit 39, the determination whether the intersection is in the intervention control area A22 or not is performed (STEP S07). In a case where the intersection is determined to be in the intervention control area A22, the amount of control of the intervention control is calculated by the driving support control unit 39 based on the map M, for example (STEP S08). In contrast, in a case where the intersection is not determined to be in the intervention control area A22, the process proceeds to STEP S12.

Next, in the driving support control unit 39, the determination whether the intersection is in the emergency intervention control area A23 or not is performed (STEP S09). In a case where the intersection is determined to be in the emergency intervention control area A23, the amount of control for the emergency avoidance is calculated in the driving support control unit 39 (STEP S10). In contrast, in a case where the intersection is not determined to be in the emergency intervention control area A23, the process proceeds to STEP S12.

In STEP S11, the driving support is implemented. Specifically, the warning is performed with respect to the driver by the HMT 9. In addition, the intervention control is implemented by the intervention control ECU 11 together with the warning by the HMI 9.

In addition, in STEP S12, the determination is performed of whether the moving object is the moving object subjected to the determination whether the driving support is to be implemented or not in the driving support determination unit 35 (moving object subjected to the control in the previous determination). In a case where the moving object is determined to be the moving object subjected to the control in the previous determination, the process proceeds to STEP S13. In contrast, in a case where the moving object is not determined to be the moving object subjected to the control in the previous determination, the process proceeds to STEP S11.

In STEP S13, the determination is performed whether the extension mode is to be implemented or not using the determination map MC in the extension mode determination unit 37. In a case where the extension mode is determined to be implemented, the process proceeds to STEP S14. In contrast, in a case where the extension mode is not determined to be implemented, the driving support is finished (STEP S16).

In STEP S14, the amount of control of the driving extension mode is calculated in the driving support control unit 39. Then, the driving support of the extension mode is implemented by the intervention control ECU 11 (STEP S15).

As described above, in the present embodiment, the TTC and TTV is calculated and predicted in the collision time prediction unit 31, and the TTC and TTV are applied to the map M, and then the driving support determination unit 35 determines whether the driving support is to be implemented or not in the host vehicle. In this way, by predicting the TTV which is the time for the moving object to arrive at the intersection, that is, the collision time in the approaching direction of the moving object to the host vehicle, necessity of the driving support can be appropriately determined. As a result, for example, a situation that the driving support is implemented even when the moving object is crossing the road can be avoided, and it is possible to implement the effective driving support without making the driver uncomfortable.

In addition, in a case where the speed of the moving object is less than the predetermined value (for example vy=0), and the driving support is determined to be not implemented in the driving support determination unit 35, and then the determination is performed whether the driving support by the extension mode is to be implemented or not by the extension mode determination unit 37, and in a case where the extension mode is determined to be implemented, the amount of control of the extension mode is calculated in the driving support control unit 39, and the driving support is extended (continued). In this way, the time in which the driving support is not implemented has not occurred between the time when the driving support in the driving support apparatus 1 is finished and the time when the driving support by the PCS 20 is started. Therefore, even in a case where the moving object is stopped, since the intervention control is continued until the next driving support, the discomfort of the driver can be decreased.

In addition, in the determination whether the driving support of the extension mode is to be implemented or not in the extension mode determination unit 37, the determination map MC is used. In this way, it is possible to reliably perform the determination whether the extension mode is to be implemented or not.

The present invention is not limited to the embodiment described above. For example, in the embodiment described above, the determination for the extension mode is performed in the extension mode determination unit 37 using the determination map MC. However, maps illustrated in FIG. 8 and FIG. 9 may be used as the determination map.

Figure 8:
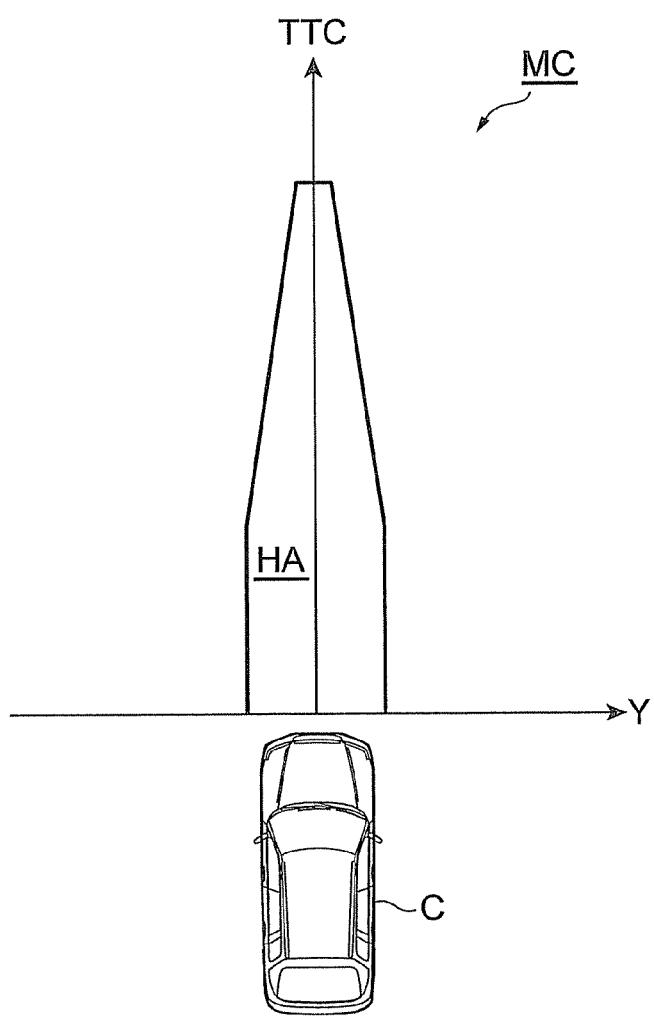
FIG. 8 is a diagram illustrating a determination map according to another embodiment.

FIG. 8 is a diagram illustrating a determination map according to another embodiment. As illustrated in FIG. 8, the width of the determination area HA of the determination map MC becomes narrow (tapered) as the TTC increases from the predetermined time of TTC. This determination map MC is used in a case where the speed of the moving object in the moving object information detected by the moving object detection sensor 5 is equal to or less than the predetermined value. That is, the extension mode determination unit 37 extracts the determination map MC from the map storage unit 33 according to the speed of the moving object. By using such determination map MC, it is possible to more appropriately perform the determination of the extension mode.

Figure 9:
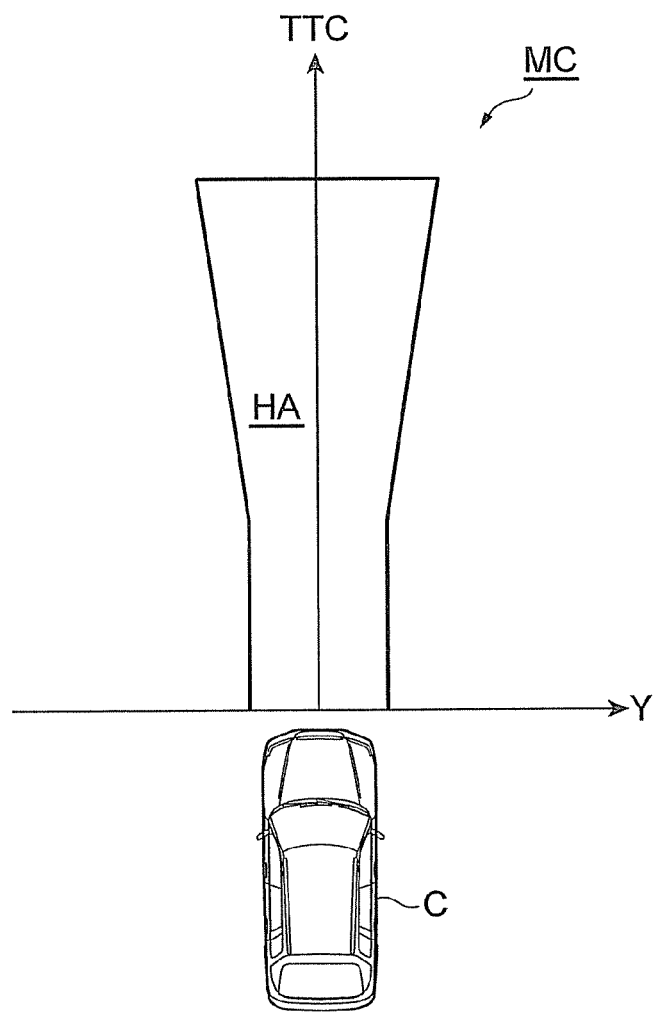
FIG. 9 is a diagram illustrating a determination map according to another embodiment.

FIG. 9 is a diagram illustrating a determination map according to another embodiment. As illustrated in FIG. 9, the width of the determination area HA of the determination map MC becomes wide as the TTC increases from the predetermined time of TTC. This determination map MC is used in a case where the speed of the moving object in the moving object information detected by the moving object detection sensor 5 is equal to or greater than the predetermined value. That is, the extension mode determination unit 37 extracts the determination map MC from the map storage unit 33 according to the speed of the moving object. By using such determination map MC, it is possible to more appropriately perform the determination of the extension mode.

Figure 10:
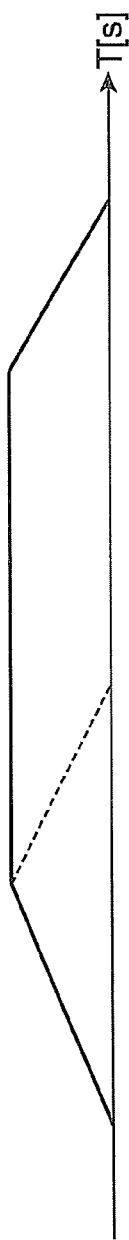
FIG. 10 is a diagram illustrating a method of calculating an amount of braking according to another embodiment.

In addition, in the driving support control unit 39, the amount of control of the extension mode may be calculated as follows. As illustrated in FIG. 10, in the driving support control unit 39, the amount of control of the extension mode is calculated such that a predetermined amount of braking is maintained for a certain time interval. Specifically, the driving support control unit 39 calculates the amount of control of the extension mode by Equation (5) below.

$$TTC_{off} - TTC_{pcs} + \alpha \tag{5}$$

Figure 11:
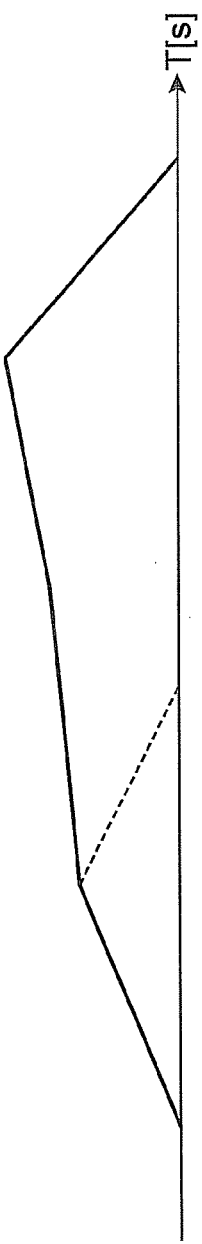
FIG. 11 is a diagram illustrating a method of calculating an amount of braking according to another embodiment.

In addition, in the driving support control unit 39, the amount of control of the extension mode may be calculated as described below. As illustrated in FIG. 11, in the driving support control unit 39, the deceleration with respect to the moving object from the time of finishing the braking control is operated, and the minimum value is selected, and then the amount of control is calculated. Specifically, the driving support control unit 39 calculates the amount of control of the extension mode by Equation (6) below.

$$vx^2/2L \tag{6}$$

In Equation (6), L indicates the distance to the moving object.

In addition, in embodiment described above, in a case where the intervention control is implemented by the intervention control ECU 11, the warning by the HMI 9 is implemented simultaneously.

However, when the intervention control is implemented, the warning by the HMI 9 may not be implemented.

Furthermore, in addition to the above-described embodiment, the configuration may include means for acquiring surrounding information (environmental information) of the host vehicle, and the driving support may be implemented according to the surrounding situation and state (for example, a presence or an absence of an oncoming vehicle, or the like) of the host vehicle.

REFERENCE SIGNS LIST 1 driving support apparatus
3 ECU
5 moving object detection sensor
7 vehicle sensor
31 collision time prediction unit (first time prediction means, second time prediction means)
33 map storage unit
35 driving support determination unit (first driving support determination means)
37 extension mode determination unit (second driving support determination means)
39 driving support control unit (driving support control means)
M map (first map)
MC determination map (second map)

The invention claimed is:

1. A driving support apparatus that implements a driving support for avoiding a collision of a host vehicle and a moving object, the apparatus comprising:
    first time prediction means for predicting a first time that it takes for the host vehicle to arrive at an intersection where the host vehicle and the moving object cross, in a traveling direction of the host vehicle and a direction crossing the traveling direction;
    second time prediction means for predicting a second time that it takes for the moving object to arrive at the intersection, in a direction crossing the traveling direction;
    first driving support determination means for determining whether the driving support is to be implemented or not in the host vehicle by applying the first time and the second time predicted by the first time prediction means and the second time prediction means, respectively, to a first map set in advance;
    driving support control means for controlling the driving support in the host vehicle in a case where the first driving support determination means determines that the driving support is to be implemented in the host vehicle; and
    second driving support determination means for determining whether a speed of the moving object in a direction crossing the traveling direction is equal to or less than a first threshold value and whether the first time is equal to or less than a second threshold value or not in a case where the first driving support determination means determines that the driving support is not to be implemented, and for determining that the driving support is to be implemented in the host vehicle in a case where the conditions are satisfied,
    wherein, in a case where the second driving support determination means determines that the driving support is to be implemented, even in a case where the first driving support determination means determines that the driving support is not to be implemented, the driving support control means continues to implement the driving support in the host vehicle.

2. The driving support apparatus according to claim 1, further comprising:
    traveling state detection means for detecting a traveling state of the host vehicle; and
    moving object state detection means for detecting a state of the moving object,
    wherein the first time prediction means and the second time prediction means predict the first time and the second time, respectively, based on the traveling state of the host vehicle detected by the traveling state detection means and the state of the moving object detected by the moving object state detection means.

3. The driving support apparatus according to claim 1, wherein the second driving support determination means determines whether the first time is equal to or less than the second threshold value or not using a second map set in advance.

4. The driving support apparatus according to claim 3, wherein, in the second map, a determination area specified by the first time and a distance in a width direction of the host vehicle is set, and
    wherein, in a case where the first time is in the determination area, the second driving support determination means determines that the first time is equal to or less than the second threshold value, and in a case where the moving object is in the determination area, determines that the driving support be implemented.

5. The driving support apparatus according to claim 4, further comprising:
    a plurality of second maps on which the determination areas are set according to the speed of the moving object,
    wherein the second driving support determination means changes the second map used according to the speed of the moving object in a direction crossing the traveling direction.

6. The driving support apparatus according to claim 1, wherein, in a case where the second driving support determination means determines that the driving support is to be implemented, the driving support control means performs the control such that a braking control release slope when the braking control is released becomes more gradual than usual.

7. The driving support apparatus according to claim 1, wherein, in a case where the second driving support determination means determines that the driving support is to be implemented, the driving support control means performs the control such that a predetermined amount of braking is maintained for a certain time interval.

8. The driving support apparatus according to claim 1, wherein, in the first map, the first time is set on the vertical axis and the second time is set on the horizontal axis, and a first area where the driving support is determined to be not necessary and a second area where the driving support is determined to be necessary are set, and
    wherein, in a case where a point where the first time and the second time intersect is present in the second area, the first driving support determination means determines that the driving support is to be implemented in the host vehicle.

9. A driving support method for avoiding a collision of a host vehicle and a moving object, the method comprising:
    a first time prediction step of predicting a first time that it takes for the host vehicle to arrive at an intersection where the host vehicle and the moving object cross, in a traveling direction of the host vehicle and a direction crossing the traveling direction;
    a second time prediction step of predicting a second time that it takes for the moving object to arrive at the intersection, in a direction crossing the traveling direction;
    a first driving support determination step of determining whether the driving support is to be implemented or not in the host vehicle by applying the first time and the second time predicted in the first time prediction step and the second time prediction step, respectively, to a first map set in advance;
    a driving support control step of controlling the driving support in the host vehicle in a case where the driving support is determined to be implemented in the host vehicle in the first driving support determination step; and
    a second driving support determination step of determining whether a speed of the moving object in a direction crossing the traveling direction is equal to or less than a first threshold value and whether the first time is equal to or less than a second threshold value or not in a case where the driving support is determined to be not implemented in the first driving support determination step, and for determining that the driving support is to be implemented in the host vehicle in a case where the conditions are satisfied,
    wherein, in a case where the driving support is determined to be implemented in the second driving support determination step, even in a case where the driving support is determined to be not implemented in the first driving support determination step, the driving support in the host vehicle is continued to be implemented in the driving support control step.

10. A driving support apparatus that implements a driving support for avoiding a collision of a host vehicle and a moving object, the apparatus comprising:
   first time prediction unit configured to predict a first time that it takes for the host vehicle to arrive at an intersection where the host vehicle and the moving object cross, in a traveling direction of the host vehicle and a direction crossing the traveling direction;
   second time prediction unit configured to predict a second time that it takes for the moving object to arrive at the intersection, in a direction crossing the traveling direction;
   first driving support determination unit configured to determine whether the driving support is to be implemented or not in the host vehicle by applying the first time and the second time predicted by the first time prediction unit and the second time prediction unit, respectively, to a first map set in advance;
   driving support control unit configured to control the driving support in the host vehicle in a case where the first driving support determination unit determines that the driving support is to be implemented in the host vehicle; and
   second driving support determination unit configured to determine whether a speed of the moving object in a direction crossing the traveling direction is equal to or less than a first threshold value and whether the first time is equal to or less than a second threshold value or not in a case where the first driving support determination unit determines that the driving support is not to be implemented, and for determining that the driving support is to be implemented in the host vehicle in a case where the conditions are satisfied,
   wherein, in a case where the second driving support determination unit determines that the driving support is to be implemented, even in a case where the first driving support determination unit determines that the driving support is not to be implemented, the driving support control unit continues to implement the driving support in the host vehicle.

11. The driving support apparatus according to claim 10, further comprising:
   traveling state detection unit configured to detect a traveling state of the host vehicle; and
   moving object state detection unit configured to detect a state of the moving object,
   wherein the first time prediction unit and the second time prediction unit predict the first time and the second time, respectively, based on the traveling state of the host vehicle detected by the traveling state detection unit and the state of the moving object detected by the moving object state detection unit.

12. The driving support apparatus according to claim 10, wherein the second driving support determination unit determines whether the first time is equal to or less than the second threshold value or not using a second map set in advance.

13. The driving support apparatus according to claim 12, wherein, in the second map, a determination area specified by the first time and a distance in a width direction of the host vehicle is set, and
   wherein, in a case where the first time is in the determination area, the second driving support determination unit determines that the first time is equal to or less than the second threshold value, and in a case where the moving object is in the determination area, determines that the driving support be implemented.

14. The driving support apparatus according to claim 13, further comprising:
   a plurality of second maps on which the determination areas are set according to the speed of the moving object, wherein the second driving support determination unit changes the second map used according to the speed of the moving object in a direction crossing the traveling direction.

15. The driving support apparatus according to claim 10, wherein, in a case where the second driving support determination unit determines that the driving support is to be implemented, the driving support control unit performs the control such that a braking control release slope when the braking control is released becomes more gradual than usual.

16. The driving support apparatus according to claim 10, wherein, in a case where the second driving support determination unit determines that the driving support is to be implemented, the driving support control unit performs the control such that a predetermined amount of braking is maintained for a certain time interval.

17. The driving support apparatus according to claim 10, wherein, in the first map, the first time is set on the vertical axis and the second time is set on the horizontal axis, and a first area where the driving support is determined to be not necessary and a second area where the driving support is determined to be necessary are set, and
   wherein, in a case where a point where the first time and the second time intersect is present in the second area, the first driving support determination unit determines that the driving support is to be implemented in the host vehicle.

* * * * *